United States Patent [19]

Stahl

[11] Patent Number: 5,666,853

[45] Date of Patent: Sep. 16, 1997

[54] DUAL CONFIGURATION EPICYCLE DRIVE

[75] Inventor: Keenan W. Stahl, Glenwood City, Wis.

[73] Assignee: Doboy Packaging Machinery, Inc., New Richmond, Wis.

[21] Appl. No.: 526,087

[22] Filed: Sep. 11, 1995

[51] Int. Cl.⁶ .................................................. F16H 35/02
[52] U.S. Cl. ............................ 74/393; 83/324; 83/593
[58] Field of Search .......................... 474/73, 74, 84; 74/393; 53/374.4, 371.4; 83/298, 311, 324, 593

[56] References Cited

U.S. PATENT DOCUMENTS

| | | |
|---|---|---|
| 616,226 | 12/1898 | De Morgan . |
| 1,810,043 | 4/1931 | Harber et al. . |
| 2,316,131 | 4/1943 | Cardwell . |
| 2,338,404 | 1/1944 | Carroll . |
| 2,352,797 | 7/1944 | Miller . |
| 2,544,327 | 3/1951 | Keim et al. . |
| 2,650,505 | 9/1953 | Vannatta . |
| 2,799,175 | 7/1957 | Peck . |
| 2,954,709 | 10/1960 | Heckel et al. . |
| 3,017,782 | 1/1962 | Wilson . |
| 3,186,242 | 6/1965 | Deans et al. . |
| 3,192,798 | 7/1965 | Twamley . |
| 3,203,279 | 8/1965 | Rahrig et al. . |
| 3,231,990 | 2/1966 | Mosbacher . |
| 3,314,297 | 4/1967 | De Courcy . |
| 3,430,310 | 3/1969 | Richbourg . |
| 3,436,977 | 4/1969 | Gredell ........................................ 474/74 |
| 3,485,108 | 12/1969 | Lang et al. . |
| 3,902,376 | 9/1975 | Humphrey . |
| 3,906,810 | 9/1975 | Glendening . |
| 5,055,087 | 10/1991 | Koch . |

*Primary Examiner*—Charles A. Marmor
*Assistant Examiner*—Troy Grabow
*Attorney, Agent, or Firm*—Haugen and Nikolai, P.A.

[57] ABSTRACT

The present invention is an epicycle dual drive apparatus comprising a frame supporting an input shaft, an output shaft and an epicycle drive coupling the input shaft and the output shaft. The apparatus has dual clutches means coupled individually to the input shaft and output shaft. The epicycle drive means includes an epicycle rack pivotally secured to said output shaft at one end and a crankshaft journaled for rotation at a second end. The output shaft may have a varying rate of rotation depending on the position of the center of the crank shaft on the epicycle rack with respect to the center of the input shaft. A Cam arrangement is used for coupling the input shaft and the crankshaft. The first clutch coupled to the output shaft allows for selective engagement of the output shaft and the second clutch is coupled to the crankshaft for selective engagement of the crankshaft. Only one clutch can be engaged at a time. Two timing pulley arrangements, each having a different pulley ratio, are selectively coupled by the two clutches to drive the output shaft and the crimper shafts coupled to it.

19 Claims, 6 Drawing Sheets

DUAL CONFIGURATION EPICYCLE DRIVE

I. FIELD OF THE INVENTION

The present invention relates to high speed horizontal wrapping and packaging machinery and more particularly to a cutting head epicycle drive apparatus which accommodates various cutting/crimper head arrangements used in the high speed wrapping and packaging machine.

II. BACKGROUND OF THE INVENTION

In a high speed wrapping and packaging machine such as a horizontal wrapping machine, a continuous film of packaging material is supplied from a roll and drawn past a film former which shapes the film into a continuous tube of packaging material. Products to be wrapped are supplied through the film former and into the tube of packaging material such that products are spaced apart from one another in the packaging material tube. The packaging material tube is then cut and sealed as each product, carried within the tube, passes a sealing and cutting station. In this way, an individual sealed package is produced for each product from the continuous roll of packaging film material.

As the enclosed tube of packaging film material, carrying products spaced apart from one another, advances through the sealing and cutting station, a pair of opposed cutting heads are rotated into engagement with the packaging film tube at a location on the film tube between each successive pair of products. The cutting heads typically carry a crimper arrangement of cutting blade on one cutting head shaft extending transversely to the packaging film tube and an anvil on the other cutting head shaft which cooperates with the cutting blade for performing the cutting operation. Alternative cutting shaft embodiments have two blades or anvils spaced 180 degrees apart on the shaft or four blades or anvils spaced 90 degrees apart on the shaft. Operators typically use two different head configurations for their various wrapping and cutting operations. This requires the operator to periodically remove the cutting head shafts with one crimper configuration and replacing them with shafts having a different crimper configuration.

The cutting/crimper shafts on high speed horizontal wrapping and packaging apparatuses typically do not rotate at a constant angular velocity. As the crimpers come together on the film they must slow down to match the speed of the film passing between the crimpers. Crimpers generally need to slow down more for shorter products than for longer products. An epicycle drive is used to create the nonuniform rotational speed of the shaft. In a typical epicycle drive, a crankshaft is positionable so as to be concentric or non-concentric with the input shaft. When the crankshaft is moved to a non-concentric position, it has a nonuniform rotational speed. A cam arrangement is used to couple the input shaft and crankshaft to one angle and thereby enables the nonuniform speed of rotation of the crankshaft.

A delay or deceleration profile, hereinafter termed a "pause " must be adjusted each time a different crimper arrangement is used and each time a different length of product is packaged. Adjusting an epicycle drive to match the product to be wrapped is a time consuming task which requires changing belts, pulleys, sprockets and related items. Therefore, it is an object of the present invention to provide a cutting head drive apparatus which allows easy adjustment of the pause when a different crimper arrangement on the shafts is used or a different length product is being wrapped and packaged.

Yet another object of the present invention is to provide a cutting head drive apparatus which incorporates a dual drive allowing the operator to interchange cutting shafts having different crimper head configurations without the need for changing belts, pulleys and related items on the drive apparatus.

Still another object of the present invention is to provide a cutting head epicycle drive arrangement which allows changing over to a different cutting head configuration and being able to adjust the epicycle drive for obtaining the proper pause without changing sprockets, chains and related items.

A further object of the present invention is to provide a epicycle drive arrangement in which the power is selectively transmitted from the crankshaft to the output shaft through one of two timing pulley and clutch arrangements.

Another object of the present arrangement is to provide an epicycle drive arrangement which incorporates two drives independently controlled by air clutches which allows the operator to change from one crimper configuration to another and provide the proper drive and pause requirement by disengaging one clutch and engaging the other clutch.

A still further object of the present invention is to provide a dual drive arrangement which allows the pause to be adjusted by utilizing a pivoting epicycle rack to change the distance between the axis of rotation of the crankshaft and the output shaft selectively coupled to two clutch arrangements.

III. SUMMARY OF THE PRESENT INVENTION

To achieve these and other objects of the present invention there is provided an epicycle drive device for driving a cutting head on a high speed wrapping and packaging machine. The epicycle drive device includes a frame on which an input shaft and an output shaft are journaled. The output shaft is spaced apart from and parallel to the input shaft. An epicycle rack is pivotally mounted at a first end thereof to the output shaft. The rack contains a cam slot located at its second end in which a cam follower is received. The cam follower is located in a block mounted on a lead screw rotatably mounted relative to the frame. Rotation of the lead screw causes the adjustment block to move in a direction transverse to the axis of rotation of the input and output shafts. As the cam follower moves in the transverse direction, the epicycle rack is pivoted about the output shaft, also in a direction which is transverse to the axis of rotation of the input and output shafts.

A crankshaft, spaced apart from the output shaft is journaled for rotation in the epicycle rack. The crankshaft moves with the epicycle rack and is positionable to be concentric or non-concentric with respect to the input shaft. The crankshaft is coupled to the input shaft by a cam means. A rectangular shaped gib is located on the end of the input shaft adjacent the crankshaft. The gib contains an elongate cam slot for receiving the cam follower located on the crankshaft. The cam follower is offset from the axis of rotation of the crankshaft. When the crankshaft is pivoted about the output shaft along with the rack, the cam follower slides along the gib cam slot, enabling the input shaft to drive the crankshaft whether or not the crankshaft is concentric with the input shaft. The rotational speed of the crankshaft becomes nonuniform with the slowest speed or pause occurring where the distance between the input shaft axis of rotation and cam follower is at a minimum.

The epicycle drive device contains two clutch means. A first clutch is located on the crankshaft. A first timing pulley arrangement is coupled to the first clutch and includes a first pulley that is adjacent to the clutch and is spaced apart from a second pulley located on the output shaft. When this first clutch is engaged, rotational movement from the crankshaft is transmitted to the output shaft, via the first timing pulley arrangement. The pulleys may have a one-to-one ratio or any other desired ratio. The second clutch is located on the output shaft. This clutch is coupled to the crankshaft with a second timing pulley arrangement which includes a first pulley on the output shaft coupled to a second pulley on the crankshaft. When the second clutch is engaged, rotational movement from the crankshaft is transmitted to the output shaft via the second timing pulley arrangement. Like the first timing pulley arrangement, the second timing pulleys may have a one-to-one ratio or any other desired combination. Only one clutch is engaged at a time and the drive is in neutral when both clutches are disengaged.

When the rack is rotated to its counterclockwise position the input shaft and crankshaft are concentric with each other, the output shaft rotates at a constant speed. This configuration has a zero pause meaning that the crimper shafts move at a uniform velocity. As the epicycle rack pivots away from the concentric position, the distance from the cam follower to the center of the input shaft changes throughout the rotation. The shaft's rotational speed increases as the cam follower moves away from the input shaft and decreases when the cam follower moves towards the input shaft. The point where the distance is at a minimum, the shaft has the maximum pause or the slowest speed. When the rack is rotated to its extreme clockwise position the output shaft rotates at its maximum pause.

IV. BRIEF DESCRIPTION OF THE DRAWINGS

The foregoing features and advantages of the present invention will become apparent to those skilled in the art from the foregoing detailed description of a preferred embodiment, especially when considered in conjunction with the accompanying drawings in which.

V. DETAILED DESCRIPTION OF THE PREFERRED EMBODIMENT

Figure 1:
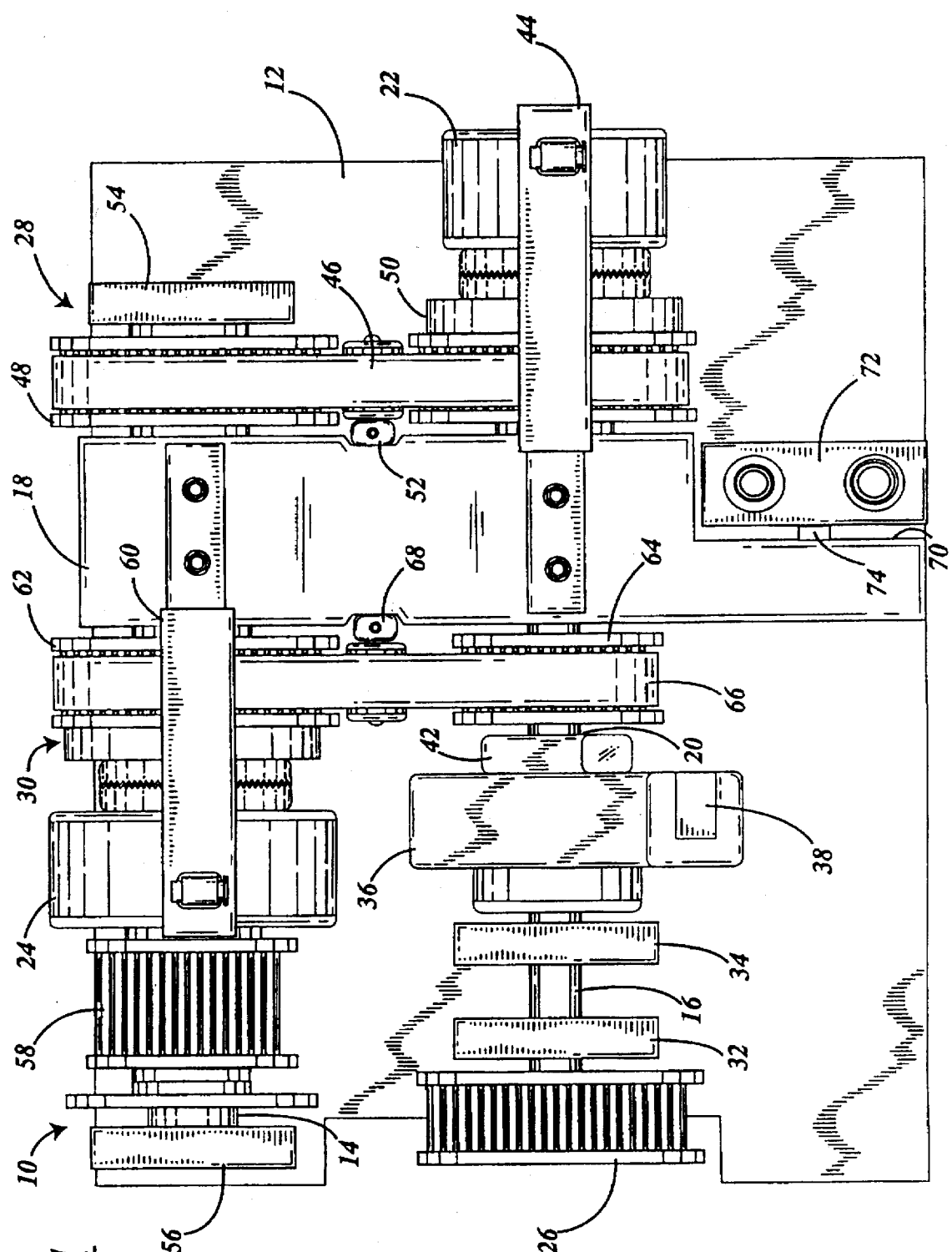
FIG. 1 is a side view of the present invention.

The present invention, designated generally as 10 in FIG. 1, includes a frame member 12 to which an output shaft 14 and an input shaft 16 are supported. Pivotally mounted on the output shaft is an epicycle rack 18 which comprises a bearing block. A crankshaft 20 is journaled for rotation in bearings fitted into a bore in the epicycle rack 18 and, as explained below, a manually adjustable lead screw is operatively coupled to the epicycle rack 18 to allow adjustment of the eccentricity of the input shaft relative to the crankshaft. A first clutch 22 is located on the crankshaft and a second clutch 24 is located on the output shaft. The input shaft 16 is coupled to a drive motor through a belt (not shown) surrounding input pulley 26. The first clutch 22 is coupled to the crankshaft 20 by a first timing pulley arrangement indicated generally by 28. The second clutch 24 is coupled to the output shaft 14 by a second timing pulley arrangement 30.

Figure 5:
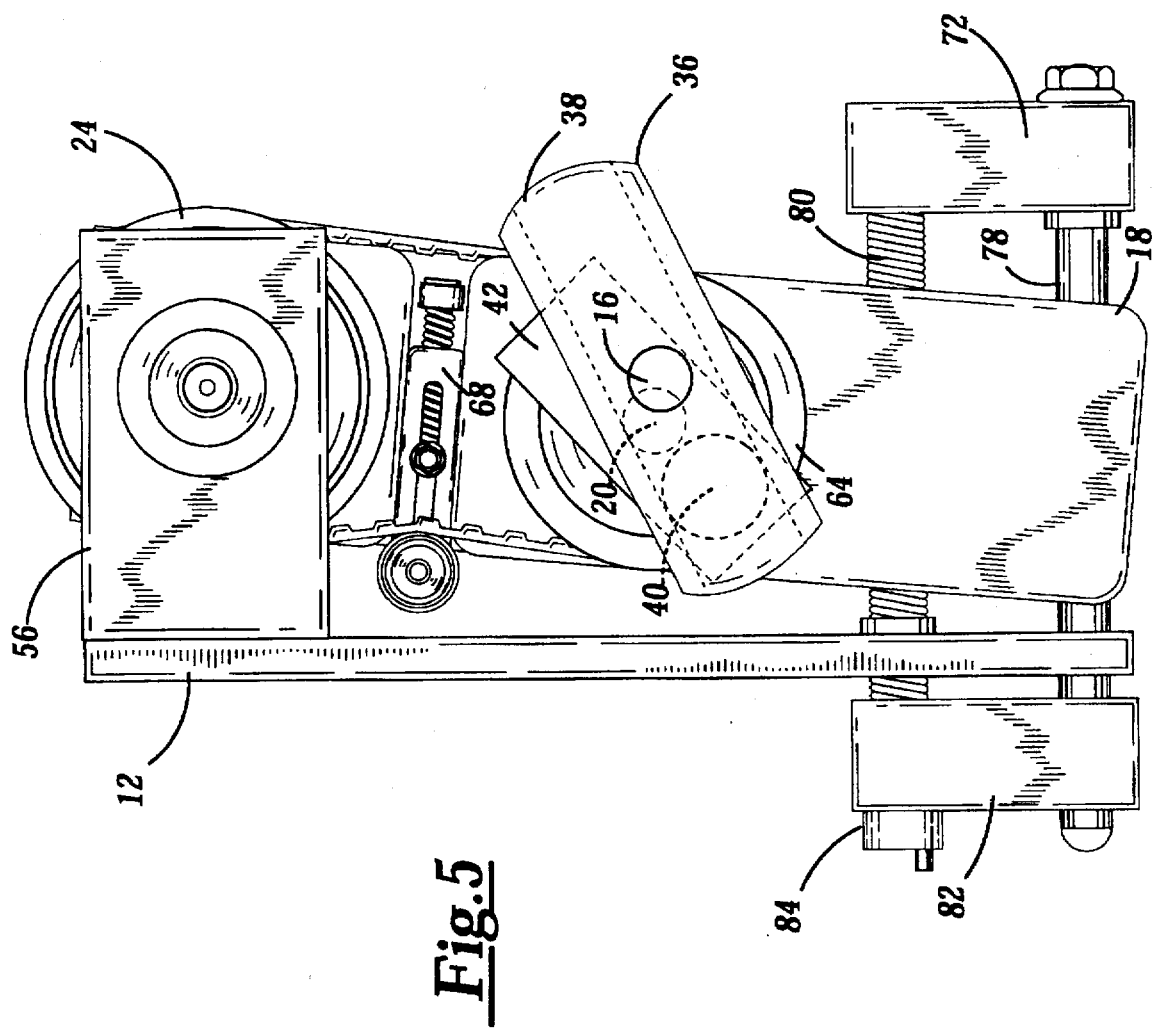
FIG. 5 is a front view with the input pulley and shaft of the present invention removed and a certain feature shown in hidden line.

As seen in FIG. 1, the input shaft 16 is journaled on the frame 12 with bearing blocks 32 and 34. The input pulley 26 is located on a first end of the input shaft 16 and a gib 36 is located on a second end. This gib 36 has a generally rectangular shape and contains a longitudinal cam slot 38. A cam follower 40 (as seen in FIG. 5) located on the end of crankshaft 20 is received in the cam slot 38. Cam follower 40 is mounted to a rectangular member 42 on the end of the crankshaft 20, allowing the cam follower 40 to be eccentric to the crankshaft center.

Figure 2:
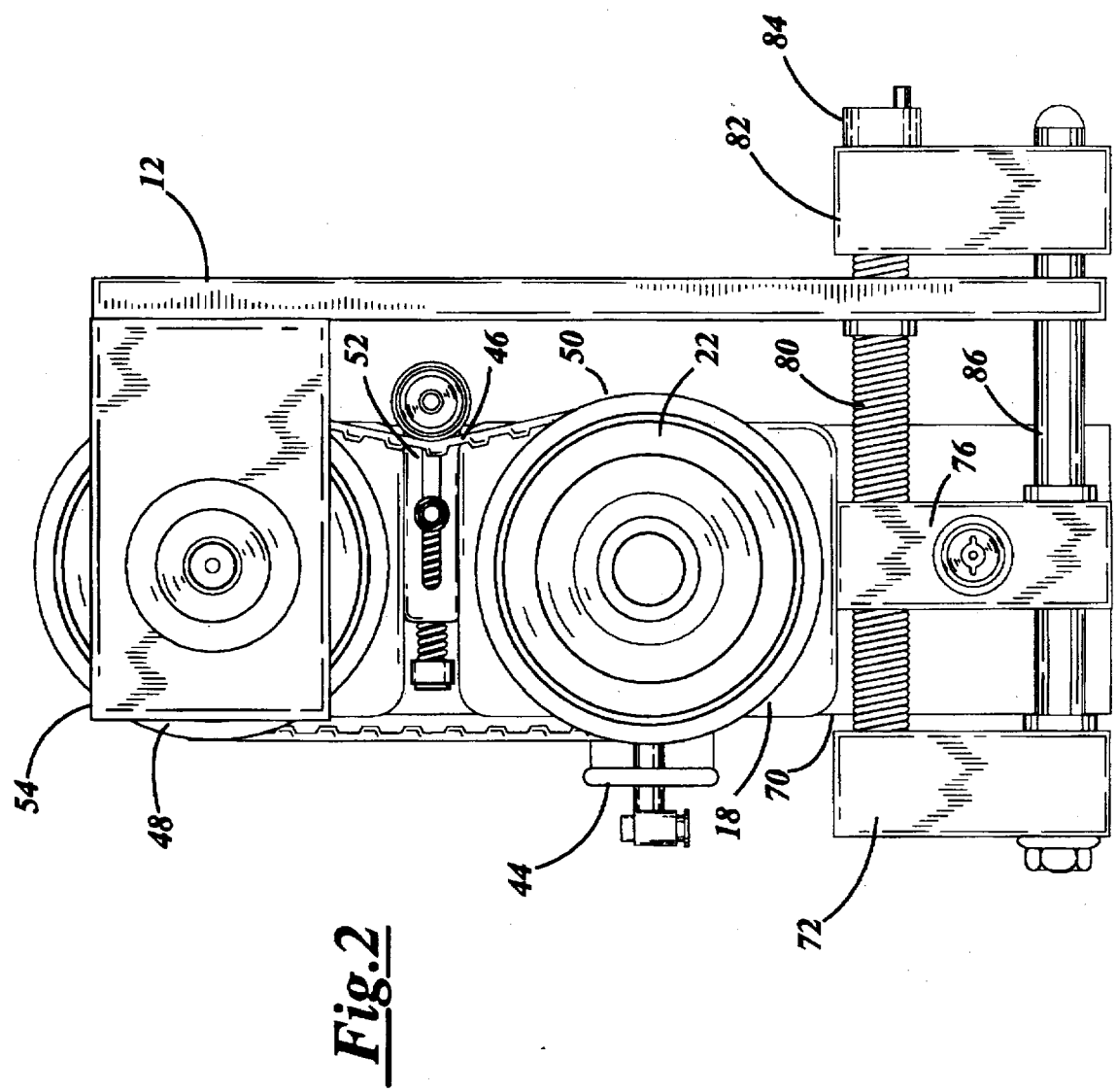
FIG. 2 is a rear view of the present invention.
Figure 3:
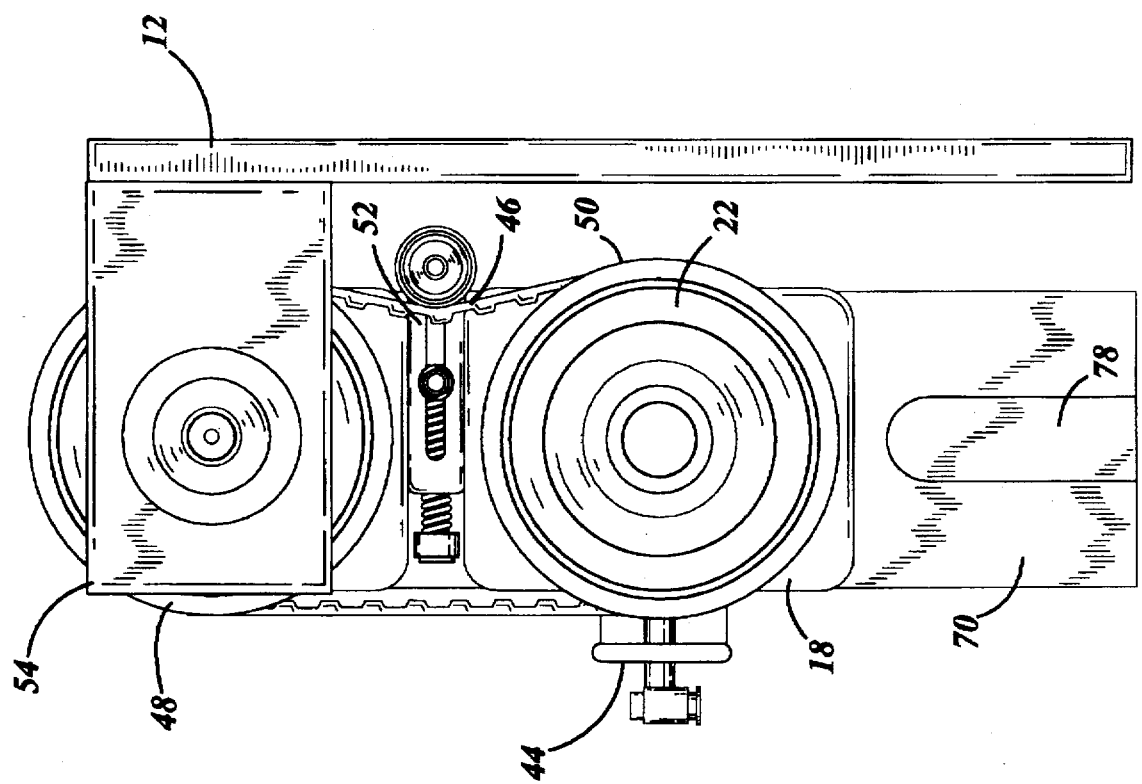
FIG. 3 is a rear view with structure removed to show certain features of the present invention.
Figure 6C:
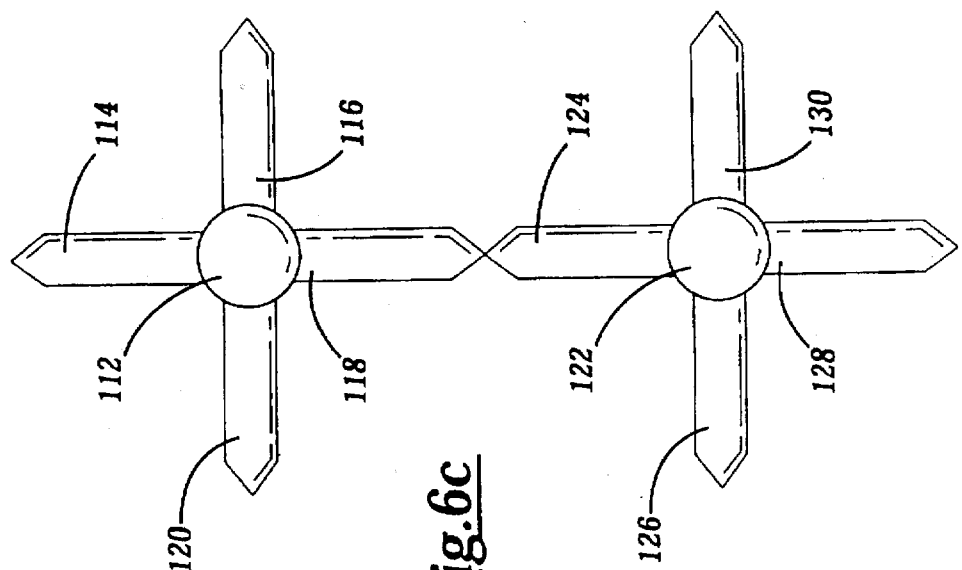
FIGS. 6a–c are schematics showing various crimper configurations.
Figure 6B:
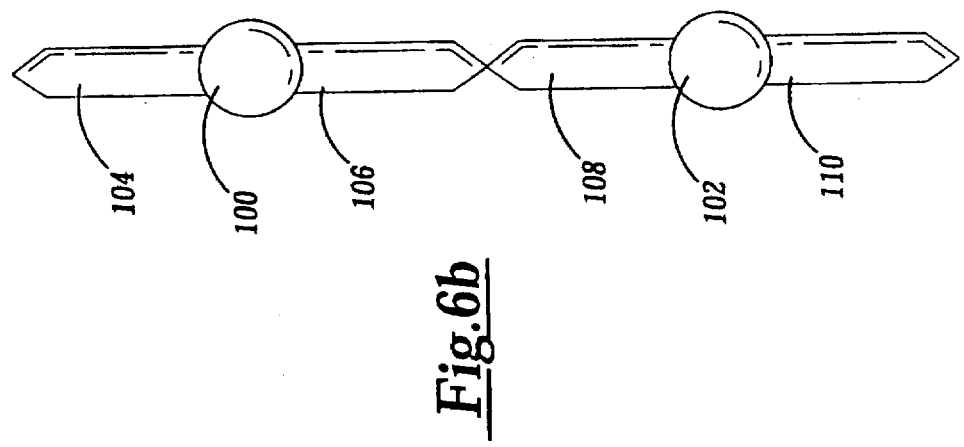
Figure 6A:
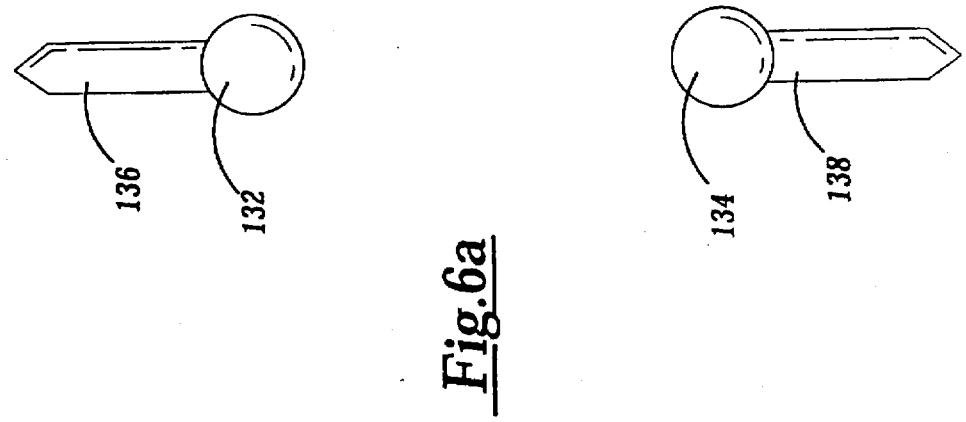

As seen in FIGS. 1–3, the crankshaft 20 supports the first clutch 22, which is also connected to the epicycle rack 18 with a mounting bracket 44. The first clutch 22 is preferably an air clutch although any suitable clutch may be used. The first pulley arrangement 28 is preferably a timing pulley and belt arrangement. Belt 46 is entrained about pulleys 48 and 50 and a belt tension adjustor 52 is also located on the pulley arrangement. The pulleys shown have a one-to-one ratio and are used for a so called 2-up crimper configuration. FIG. 6b shows a schematic of a 2-up crimper configuration. Each cutting shaft 100 and 102 has 2 opposing crimpers 104, 106, 108 and 110 and will pause twice during one revolution of the output shaft pulley 58. This allows the cooperating crimper heads to decelerate to match the film speed as the crimpers meet. A different ratio between the two pulleys may be needed depending upon the crimper configuration. FIGS. 6a–c are schematics of commonly used crimper arrangement. A 2 to 1 pulley ratio is used with a 4-up crimper configuration as shown in FIG. 6c. The 4-up crimper configuration has a shaft 112 with four crimpers 114, 116, and 118 and 120 spaced 90° apart and a shaft 122 with four crimpers 124, 126, 128 and 130 spaced 90° apart. A 1 to 2 pulley ratio is used with a 1-up crimper configuration shown in FIG. 6a. Each shaft, 132 and 134, has one crimper, 136 and 138, respectively.

The second clutch 24 is located on the output shaft 14. The output shaft is journaled on the frame bearing blocks 54 and 56. An output pulley 58 located on the end of the output shaft is coupled to the cutting head with a belt (not shown). The cutting head will rotate ½ revolution for every one revolution of pulley 58. The second clutch 24, like the first clutch is preferably an air operated clutch. This clutch 24 is secured to the epicycle rack 18 with a mounting bracket 60. Adjacent clutch 24 is pulley arrangement 30 with a notched timing pulley 62, a similar pulley 64, timing belt 66 and a belt tension adjust 68. The ratio of pulley 62 to pulley 64 depends upon the desired output. The pulley ratio shown is 2 to 1 and is used for the 4 up crimper configuration shown in FIG. 6c. The cutting head shafts 112 and 122 will pause four times during one revolution of the output shaft pulley 58 with such a timing pulley arrangement.

The epicycle rack 18 is pivotally secured to the output shaft 14. The lower rear area is recessed at 70, as shown in FIG. 1, in which a pause adjustment arrangement 72 is located. The pause adjustment arrangement 72 includes a cam follower 74 on a cam block 76 (FIG. 2) which is received in a vertically oriented cam slot 78 located on the epicycle rack in the recessed area 70 as shown in FIG. 3. A lead screw 80 (FIG. 2) extends transversely from a first support block 72, through the cam block 76, through frame 12, through a second support block 82, to crank handle 84. A guide rod 86 is located in a spaced apart parallel relationship from the lead screw 80. Rotation of the lead screw 80 via the crank handle 84 moves the cam block 76 in a direction transverse to the axis of rotation of the input and output shafts 16 and 14. The epicycle rack 18 is moved counterclockwise or clockwise as the cam block 76 moves towards or away from the frame. The crank handle 84 contains a counter (not shown) so the user is able to determine how far to move the rack 18 by the number of crank handle rotations.

Figure 4:
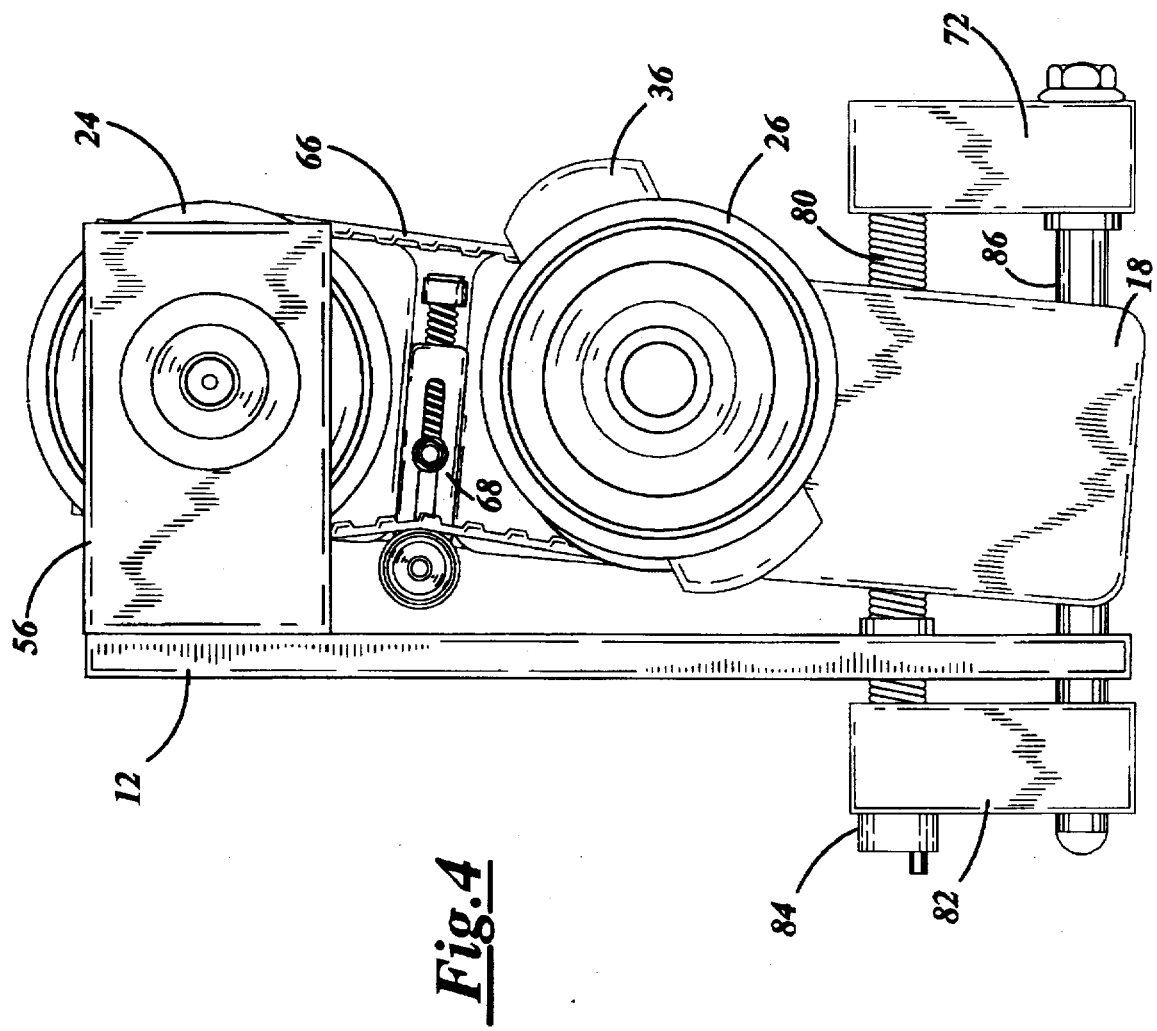
FIG. 4 is a front view of the present invention with the epicycle rack rotated to the maximum position.

The crankshaft 20, the clutches 22 and 24 and the pulley arrangements 24 and 28 move along with the epicycle rack 18. In FIGS. 4 and 5 the epicycle rack 18 is shown rotated clockwise. The crankshaft 20 is no longer concentric with the input shaft 16. Cam follower 40 remains in slot 38. As the cam follower 40 rotates with the crankshaft, its distance from the center of the input shaft 16 will vary.

To use the device, the operator must first determine which clutch and pulley arrangement is to be engaged based on which style of crimper configuration is used. The embodiment 10 shown is used with a 2-up or 4-up crimper. If a 1-up crimper configuration is to be used, a pulley arrangement with a 2 to 1 ratio is needed. When clutch 22 is engaged, the timing pulley arrangement 28 with the 1-to-1 pulley ratio transmits the rotational movement of the crankshaft 20 to the output shaft 14. The cutting head with a 2-up crimper configuration can pause twice during each revolution depending upon the setting of the epicycle rack. When clutch 24 is engaged, the timing pulley arrangement 30 with the 2-to-1 pulley ratio transmits the rotational movement of the crankshaft 20 to the output shaft 14. The cutting head with a 4-up crimper configuration can pause four times during one revolution depending upon the setting of the epicycle rack.

In addition to engaging the desired clutch coupled to the desired pulley arrangement, the operator must adjust the epicycle rack 18 to obtain the desired pause. Handle 84 coupled to the adjustment screw 80 is rotated until its counter reaches the desired number for the desired pause. As handle 84 is rotated, the cam 74 (FIG. 1) moves in the slot 78 (FIG. 3) causing the epicycle rack 18 to pivot about the output shaft 14.

Once the epicycle rack 18 is in the desired position and the proper clutch is engaged, the drive is ready for operation. The crankshaft 20 will be at maximum pause when the cam follower 40 is closest to the input shaft 16. In other words, the crankshaft 20 rotates at a varying rate. As the cam follower rotates towards the input shaft 16, the rotational rate decreases and as the cam follower 40 moves away from the input shaft 16, the rotational rate increases. As seen in FIG. 5, in this position the crankshaft 20 is rotating faster than the input shaft 16 since the cam follower 40 is in a position further away from the input shaft 16. As the cam follower rotates closer to the input shaft 16, then the crankshaft rate of desired rotation will be very similar to that of the input shaft 16, thus causing the pause. During the slow-down, the crimpers are engaging the packaging material in the cut and seal station and are traveling at the same linear velocity as the film. If a different head configuration is used, then the engaged clutch must be disengaged and the appropriate clutch engaged. Again, any time the pause must be adjusted, the operator simply moves the rack 18 via handle 84 until it is in the proper position. The operation of the device is the same. The only difference is a different clutch and pulley arrangement is used.

While the above provides a full and complete disclosure of the preferred embodiment of the present invention, various modifications, alternate constructions and equivalents will occur to those skilled in the art given the benefit of this disclosure, thus, the invention is not to the specific embodiment described herein, but as defined by the appended claims.

What is claimed:

1. An epicycle drive apparatus for cut/seal heads on a product wrapping machine comprising:
   (a) a subframe member adapted for attachment to a frame of the product wrapping machine;
   (b) an input shaft journaled for rotation on said subframe member;
   (c) an output shaft journaled for rotation on said subframe member in parallel spaced-apart relation to said input shaft;
   (d) an epicycle rack pivotally mounted on said output shaft, said epicycle rack having a crankshaft journaled for rotation therein in parallel, spaced-apart relation relative to said output shaft;
   (e) cam means including a cam follower and a cam, one of said cam follower and cam being connected to the input shaft and the other of said cam follower and cam being connected to said crankshaft for mutual engagement; and
   (f) drive means exhibiting first and second speed ratios and including first and second clutch means for selectively coupling the crankshaft to the output shaft by way of said drive means.

2. An epicycle drive apparatus comprising:
   (a) a frame;
   (b) an input shaft supported by the frame;
   (c) an output shaft supported by the frame;
   (d) an epicycle rack pivotally mounted to the output shaft;
   (e) a crankshaft journaled for rotation in the epicycle rack;
   (f) means for moving the crankshaft from a position concentric with the input shaft to a position non-concentric with said input shaft;
   (g) cam means for coupling the input shaft and the crankshaft; and
   (h) dual clutch means for selectively coupling the crankshaft to said output shaft by a first drive means having a first speed ratio or a second drive means having a second drive ratio.

3. An epicycle drive apparatus of claim 2 wherein said means for moving the crankshaft comprises:
   (a) a lead screw secured to said frame;
   (b) a pause adjustment block journaled for movement along said lead screw;
   (c) a cam follower on said pause adjustment block; and
   (d) a cam slot located on the epicycle rack for receiving said cam follower.

4. The epicycle drive apparatus of claim 2 wherein said cam means for coupling the input shaft and the crankshaft comprises a gib on one of said input shaft and crankshaft, said gib having a cam slot, and a cam follower on the other of said input shaft and crankshaft, said cam follower received in said cam slot.

5. The epicycle drive of claim 2 wherein said dual clutch means comprises
   (a) a first clutch selectively engaging said crankshaft;
   (b) the first drive means including a first pulley arrangement coupled to said crankshaft and said output shaft;
   (c) a second clutch selectively engaging said output shaft; and
   (d) the second drive means including a second pulley arrangement coupled to said crankshaft and said output shaft.

6. The epicycle drive apparatus of claim 5 wherein said first pulley arrangement has a first pulley on said crankshaft and a second pulley on said output shaft.

7. The epicycle drive apparatus of claim 6 wherein said first pulley and said second pulley have a one-to-one ratio.

8. The epicycle drive apparatus of claim 6 wherein said second pulley arrangement has a third pulley on said crankshaft and a fourth pulley on said output shaft.

9. The epicycle drive apparatus of claim 8 wherein said third pulley and said fourth pulley have a one-to-two ratio.

10. The epicycle drive apparatus of claim 8 wherein said third pulley and said fourth pulley have a two-to-one ratio.

11. An drive apparatus for cut/seal heads on a product wrapping machine comprising:

(a) a subframe member adapted for attachment to a frame of the product wrapping machine;

(b) an input shaft supported by the subframe;

(c) an output shaft supported by the subframe, said output shaft being parallel to and spaced apart from the input shaft;

(d) an epicycle rack pivotally mounted on the output shaft;

(e) a crankshaft journaled for rotation in the epicycle rack;

(f) means for pivotally moving the epicycle rack about the output shaft;

(g) means for coupling the input shaft and the crankshaft; and (h) first and second drive means including dual clutch means adapted to couple said crankshaft to said output shaft.

12. The epicycle drive apparatus of claim 11 wherein said means for pivotally moving the epicycle rack comprises a pause adjustment block coupled to said subframe, a cam follower on said pause adjustment block and a cam slot on said epicycle rack for receiving said cam follower.

13. The epicycle drive assembly of claim 11 wherein means for coupling the input shaft and the crankshaft comprises a gib on said input shaft, said gib having a recess therein and a cam follower on the said crankshaft, said cam follower received in said gib recess.

14. The epicycle drive apparatus of claim 11 wherein said dual clutch means includes a first clutch on said output shaft and coupled to said output shaft for selective engagement of said output shaft and a second clutch coupled to said crankshaft for selective engagement of said crankshaft.

15. The epicycle drive apparatus of claim 14 and further including a first pulley arrangement coupled to said first clutch, said first pulley arrangement comprising a first pulley on said crankshaft and a second pulley on said output shaft.

16. The epicycle drive apparatus of claim 15 wherein said first pulley and said second pulley have a one-to-one ratio.

17. The epicycle drive apparatus of claim 15 and further including a second pulley arrangement coupled to said second clutch, said second pulley arrangement comprising a third pulley on said crankshaft and a fourth pulley on said output shaft.

18. The epicycle drive apparatus of claim 17 wherein said third pulley and said fourth pulley have a one-to-two ratio.

19. The epicycle drive apparatus of claim 17 wherein said third pulley and said fourth pulley have a two-to-one ratio.

* * * * *